3,215,751
ISOMERISATION OF OLEFINS
Kenneth Hugh Bourne and Peter Desmond Holmes, Sunbury-on-Thames, England, assignors to The British Petroleum Company Limited, London, England, a British joint-stock corporation
No Drawing. Filed July 27, 1962, Ser. No. 213,054
Claims priority, application Great Britain, Aug. 8, 1961, 28,571/61
8 Claims. (Cl. 260—683.2)

This invention relates to a process for effecting the isomerisation of an olefinic hydrocarbon by double bond migration.

It is an object of this invention to provide a process for effecting the isomerisation of an olefinic hydrocarbon by double bond migration. It is a further object to provide a process for effecting said isomerisation without formation of a substantial proportion of hydrocarbons which have undergone skeletal isomerisation. It is a further object to provide a process for the hydrogenation of a diene hydrocarbon to a mono-olefinic hydrocarbon with double bond isomerisation of said mono-olefinic hydrocarbon. Other objects will appear hereinafter.

According to the present invention there is provided a process for the isomerisation of an olefinic hydrocarbon by double bond migration which comprises passing said hydrocarbon over a supported catalyst containing nickel which, under the operating conditions, is present in major proportion as elemental nickel, said catalyst having been previously modified by treatment with (a) elemental sulphur or (b) an organic sulphur compound or (c) $H_2S$ or (d) $CS_2$ or (e) a mixture of two or more components, selected from (a), (b), (c) and (d), said treatment being carried out under conditions such that a minor proportion of the nickel present in the catalyst is thereby combined with sulphur.

The preparation of the catalyst and its activation may be carried out by any convenient manner, the following three methods being merely illustrative.

(a) The catalyst may be prepared on the base by an impregnation technique by dissolving in water a nickel salt, for example nickel nitrate, and impregnating the support material with it. The support material may be conveniently in the form of granules or pellets of any desired size formed from ground support material. After impregnation, the catalyst is dried and is then in a form in which it can be stored for long periods without deterioration. In order to use the catalyst, it must be activated by heating to decompose the salt; in the case of the nitrate this required a temperature of about 500–550° C., and the nickel will be converted to the oxide. Final activation by reduction to metallic nickel can be carried out in a stream of hydrogen or hydrogen-containing gas at a temperature of 150° to 600° C. and at a pressure of 0–200 lbs./sq. in. gauge. The time of treatment depends upon the temperature. Typical conditions using a sepiolite catalyst support are 16 hours at 500° C. and atmospheric pressure; no damage results to the sepiolite however, if its is heated at a temperature above 600° C.

(b) The catalyst may be prepared by milling dry nickel formate with powdered catalyst support, and the mixture subsequently pelleted. The advantage of this method of preparation is that a salt such as nickel formate reduces directly to nickel (without going through the oxide state) in a non-oxidising atmosphere, for example in an inert gas or hydrogen stream at a temperature of 150° C. to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves in ammonia. This complex breaks down on heating to give nickel formate again. By using this water-soluble complex, catalysts may be prepared by the impregnation technique from normally water insoluble compounds such as nickel formate. The compound is dissolved in ammonia solution, and the solution used for the impregnation of granules or pellets of the support material. The catalyst is then dried, and activation is carried out by the method described under (b).

After the reduction, the nickel catalyst should not be allowed to come into contact with air or spontaneous oxidation of the nickel to nickel oxide may occur.

Preferably the activated catalyst contains 2 to 20% by wt. of elemental nickel, based on the total weight of catalyst.

Suitable catalysts for treatment with a sulphur-containing material and use in the process of the invention are nickel supported on alumina, kieselguhr, chalk and silica gel.

A preferred catalyst is nickel-on-sepiolite.

Sepiolite is a commercially available clay mineral, which occurs naturally and which can also be prepared synthetically. It has the ideal formula

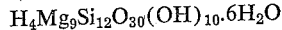

$$H_4Mg_9Si_{12}O_{30}(OH)_{10}.6H_2O$$

and is also known as meerschaum. Further information on sepiolite and its properties may be found in "Chemistry and Industry" of November 16, 1957, at pages 1492 to 1495.

Sepiolite posseses an advantage over some other bases for example alumina, in that there is no reaction of the nickel salt with sepiolite during the heating of the catalys to convert the nickel salt to oxide, and the final reduc tion can be carried out at a lower temperature than tha necessary for nickel-alumina catalysts.

In general, when a supported elemental nickel catalys is treated with a sulphur-containing compound at elevatec temperature, the extent of sulphiding is progressive a long as sulphur-containing compounds continue to pas over the catalyst and ultimately there is obtained a full sulphided catalyst.

We have found that certain classes of sulphur-contain ing compounds are only effective for a more limited de gree of sulphiding; thus after a certain degree of sulphid ing is reached, the use of further quantities of thes sulphur-containing compounds when used under the sam conditions as before does not substantially change the de gree of sulphiding. In some cases the degree of sulphic ing may be substantially independent of the sulphidin conditions and thus the degree of sulphiding will be de termined by the selection of the sulphur-containing con pound.

Sulphiding conditions which may be varied include ten perature, pressure and flow rate. Usually the sulphidir agent will be used in the vapour phase.

By the use of an organic sulphur compound which only capable of effecting a limited degree of sulphiding is possible to obtain a catalyst which has been uniform sulphided on the surface of the catalyst. Thus while would be possible to use, for sulphiding, a calculate quantity of an organic sulphur compound which does n possess this property, the resulting catalyst will be st phided to an undesirably high degree when the cataly surface is readily accessible to the organic sulphur cor pound; while it is possible to achieve an average degr of sulphiding equal to a required value, the catalyst w be in part, over-active and, in part, under active.

For the purpose of the present specification we classi sulphur-containing compounds as follows:
Class A: Thiophenes, thiacycloalkanes having at lea 4 carbon atoms in the ring and dialkyl-monosulphides.

Class B: Sulphur containing organic compounds not included in Class A (for example mercaptans, thiocyclobutane, dialkyl disulphides, elemental sulphur, hydrogen sulphide and carbon disulphide).

Compounds of Class A effect only a limited degree of sulphiding, as described hereinbefore, and these compounds are preferred for use in modifying the supported catalysts used in accordance with the present invention.

A preferred class of organic sulphur compounds for use in the production of the catalyst consists of the thiophenes. As stated hereinbefore, it has been found that these compounds are capable of sulphiding the nickel catalyst to a satisfactory extent, that is without excessive sulphide formation, even when used in excess of the amount required to provide the required amount of sulphur. Preferred thiophenes have 4 to 10 carbon atoms/molecule. Suitably there is used, for modifying the catalyst, a gasoline containing sulphur predominantly or entirely present as thiophenes. A preferred gasoline is a steam cracked gasoline produced by cracking, in the presence of steam, petroleum distillate fractions, for example primary flash distillate or naphtha fractions, preferably boiling within the range 50° C. to 250° C. Preferred cracking temperatures for the production of gasolines for use in the process of the invention exceed 1100° F. (593° C.); suitable temperatures lie in the range 1100° F. to 1400° F. (593–760° C.) and suitable cracking pressures lie in the range 0 to 60 lbs./sq. in. gauge. Preferably the gasolines have a total sulphur content of 0.005 to 0.2% by weight.

Another class of organic sulphur compound which may be employed consists of the mercaptans. However in general when using elemental sulphur, $H_2S$, $CS_2$ or organic sulphur compounds other than compounds of Class A, the use of an excess of these materials, over the amount containing the amount of sulphur required for reaction with a minor proportion of the nickel, will lead to excessive sulphiding of the catalyst; when using these materials they will usually be employed in slightly more than the stoichiometric quantities required for the sulphiding of the required proportion of the elemental nickel present in the catalyst.

Usually the treatment of the catalyst to cause sulphiding will be carried out at a temperature in the range 0–200° C. and preferably in the range 100–200° C. The treatment can be carried out at any pressure, being sub-atmospheric, atmospheric or super-atmospheric.

If desired the treatment of the catalyst may be carried out in the presence of hydrogen or a hydrogen containing gas as hereinafter described.

Usually the amount of the sulphur-containing material which is reacted with the catalyst will be such that the treated catalyst has a sulphur to nickel atomic ratio of 0.01 to 0.4.

When using a sepiolite base on which nickel has been deposited by impregnation by means of an ammoniacal solution of nickel formate the sulphur treated catalyst will preferably have a sulphur to nickel atomic ratio in the range 0.05 to 0.25.

Isomerisation in accordance with the present invention may be carried out using as feedstock any olefinic hydrocarbon capable of double bond migration of a mixture comprising at least one such olefinic hydrocarbon. Clearly, when employing mixtures, the components will not be present in the equilibrium proportions corresponding to the isomerisation conditions. Double bond isomerisation will usually be effected without change of the carbon skeleton.

The olefinic hydrocarbon may be a mono-olefin, diene or polyene; however, the preferred feedstocks are mono-olefins. Preferably the olefin has 4–6 carbon atoms/molecule.

The process of this invention is particularly suitable for the conversion to 2-methylpentene-2 of 4-methylpentene-1, 4-methylpentene-2 and/or 2-methylpentene-1; also, the conversion to 2-methylbutene-2 of 2-methylbutene- and/or 3-methylbutene-1; also for the conversion to cis- and trans-pentene-2 of pentene-1.

Preferably isomerisation is carried out at a temperature in the range 50–250° C. at any pressure being sub-atmospheric, atmospheric or super-atmospheric. Usually it will be desirable to maintain liquid phase conditions and the pressure will be selected accordingly. Usually the isomerisation will be carried out in the presence of a carrier gas, suitably nitrogen or hydrogen.

If desired the isomerisation hereinbefore described may be carried out while simultaneously effecting the hydrogenation of a diene hydrocarbon to a mono-olefin.

Thus according to another aspect of the present invention there is provided a process for the hydrogenation of a diene hydrocarbon to a mono-olefinic hydrocarbon with double bond migration of the mono-olefinic hydrocarbon so formed which comprises passing the diene hydrocarbon with hydrogen over a supported catalyst containing nickel which, under the operating conditions, is present in major proportion as elemental nickel, said catalyst having been previously modified by treatment with (a) elemental sulphur or (b) an organic sulphur compound or (c) $H_2S$ or (d) $CS_2$ or (e) a mixture of two or more components, selected from (a), (b), (c) and (d), said treatment being carried out under conditions such that a minor proportion of the nickel present in the catalyst is thereby combined with sulphur.

The feedstock may comprise at least one diene in the absence of mono-olefins whereby there is effected conversion to at least one mono-olefin and with migration of the remaining double bond present in the molecule. Alternatively the feedstock may contain a mixture of at least one diene and at least one mono-olefin, with or without other compounds, whereby a diene is converted to at least one mono-olefin and a mono-olefin present in the feedstock undergoes double bond migration.

Dienes present in the feedstock may be open chain or cyclic dienes. Preferably the dienes have 4–6 carbon atoms/molecule.

Suitable dienes which may be treated according to the present invention include piperylene, isoprene and cyclopentadiene. The feedstock may comprise one or more of these dienes in admixture with one or more mono-olefins selected, for example, from the normal pentenes, methylbutenes, normal hexenes and iso-hexenes.

If desired hydrogenation may be carried out using a gas consisting of hydrogen together with inert constituents. Preferably, when inert constituents are present, the gas contains at least 25 mol percent of hydrogen, the proportion suitably lying within the range 25–90 mol percent of hydrogen.

A preferred gas is a platformer tail gas. Suitably a gas is employed containing 70 mol percent of hydrogen. A typical gas will consist of 70 mol percent of hydrogen and 30 mol percent of methane. Other suitable gases are gas steam cracker tail gas, catalytic cracker tail gas and tail gas derived from the dehydrogenation of hydrocarbons.

The conditions for combined selective hydrogenation and isomerisation will usually comprise a temperature in the range 50–200° C. A suitable space velocity lies in the range 0.1–10 vol./vol./hour. Usually a vertical reactor, operating under downflow, is employed.

When using pressures in this range, gas mixtures having a hydrogen content of 50–90 mol percent are very suitable. Thus a gas containing 70 mol percent of hydrogen can be used with advantage.

Usually there will be used a slight excess of hydrogen over the stoichiometric quantity required for the conversion of dienes to monolefins.

The invention is illustrated but not limited with reference to the following examples.

EXAMPLE 1

A nickel-on-sepiolite catalyst was prepared as follows: 200 ml. (87 g.) of sepiolite, crushed to 6–10 mesh and roasted for 2 hrs. at 550° C., were impregnated with a solution of 29 g. nickel formate, $Ni(HCO_2)_2.2H_2O$, in 80 ml. ammonia solution (SG. 880) and 20 ml., distilled water. All the solution was absorbed. The catalyst was dried in a current of air at 100° C. for 3 hrs. The nominal nickel content was 9.6% wt.

The catalyst was activated by treatment with hydrogen at 250° C. for 4 hours at atmospheric pressure and 1000 v./v./hr.

The activated catalyst was modified by treatment with a $C_5$–$C_6$ olefinic hydrocarbon fraction containing 0.07% by wt. of sulphur compounds present mainly as thiophenes and in which the mercaptan content was less than 0.005% by wt. The fraction was passed continuously over the catalyst at 100 lbs./sq. in. gauge with hydrogen in the mole ratio 1:3, at temperatures reaching a maximum of 150° C., for 15 hours.

The feedstock was a $C_5$–$C_6$ hydrocarbon fraction and was fed over the catalyst with hydrogen in a mole ratio of 1:3. The composition of the hydrocarbon fraction, determined by gas chromatography, is shown in Table 1.

The blend was passed over the threaded catalyst for 3 hours at a gaseous feed rate of 2 vol./vol./hour and at a pressure of 100 lbs./sq. in. gauge. The temperature varied through the run as shown in Table 1.

Hydrogen absorption was maintained at approximately 1 mol/mol of diene in the feedstock by adjustment of reaction temperature.

Analysis of the product (mol percent) at different stages of the run is shown in Table 1. It is apparent that piperylene has undergone selective hydrogenation with a substantial production of cis- and trans-pentene-2.

EXAMPLE 2

The feedstock was blend of the feedstock of Example 1 with cyclopentadiene; the blend had the composition shown in Table 2. This blend was fed over the catalyst previously used according to Example 1 under the same conditions, apart from temperature.

Analysis of the product is given in Table 2. It is apparent that piperylene and cyclopentadiene have undergone selective hydrogenation with a substantial production of cis- and trans-pentene-2 and of cyclopentene.

*Table 1*

| Period on Stream (minutes) | Feed | 20–30 | 70–80 | 90–100 | 100–110 | 110–120 | 130–140 |
|---|---|---|---|---|---|---|---|
| Mid-bed catalyst Temperature (° C.) | | 159 | 155 | 183 | 190 | 191 | 191 |
| Butenes | 0.1 | Trace | Trace | Trace | Trace | Trace | Trace |
| Isopentane | Trace | 0.1 | Trace | 0.1 | Trace | 0.1 | 0.1 |
| n-Pentane | Trace | 0.6 | 0.2 | 0.3 | 0.2 | 0.3 | 0.6 |
| 3-Methylbutene-1 | Nil | 0.4 | 0.2 | 0.4 | 0.4 | 0.4 | 0.5 |
| Pentene-1 | 0.1 | 2.8 | 2.2 | 2.4 | 2.4 | 2.6 | 2.7 |
| 2-Methylbutene-1 | 1.2 | 30.6 | 29.1 | 30.7 | 31.4 | 32.0 | 31.9 |
| Trans-Pentene-2 | | | | | | | |
| cis-Pentene-2 | 1.8 | 7.1 | 6.3 | 8.1 | 7.9 | 8.1 | 8.7 |
| 2-Methylbutene-2 | 51.6 | 50.9 | 53.6 | 52.6 | 52.4 | 51.7 | 49.8 |
| trans-4-Methylpentene-2 | 3.2 | 2.1 | 2.3 | 1.6 | 1.4 | 1.3 | 2.0 |
| 2:3-Dimethylbutene-1 | | | | | | | |
| cis-4-Methylpentene | 0.4 | 0.3 | 0.4 | 0.3 | 0.3 | 0.3 | 0.3 |
| 2-Methylpentene-1 | 2.4 | 1.8 | 2.2 | 1.7 | 1.6 | 1.6 | 1.4 |
| Isoprene [1] | 1.9 | | | | | | |
| 2-Methylpentene-2 [1] | | 0.9 | 0.6 | 0.9 | 1.1 | 1.1 | 1.4 |
| 2:3-Dimethylbutene-2 | 0.3 | 0.6 | 0.3 | 0.4 | 0.5 | 0.4 | 0.4 |
| Trans-Piperylene | 24.5 | 1.3 | 1.8 | 0.3 | 0.2 | 0.1 | Trace |
| Cis-Piperylene | 12.1 | 0.5 | 0.8 | 0.1 | 0.1 | Trace | Nil |
| Unknowns | 0.4 | | Trace | 0.1 | 0.1 | Trace | 0.2 |
| H₂ Uptake: Mol H₂/Mol Diene | | 0.95 | 0.92 | 0.96 | 0.96 | 0.96 | 1.00 |

[1] These two appeared as a single peak.

*Table 2*

| Period on stream (minutes) | Feed | 30–40 | 50–60 | 70–80 | 130–140 | 180–190 | 270–280 |
|---|---|---|---|---|---|---|---|
| Mid-bed catalyst Temperature (° C.) | | 165 | 191 | 193 | 198 | 198 | 175 |
| Butenes | Trace | Trace | Trace | 0.1 | Trace | Trace | Trace |
| Isopentane | Trace | Trace | 0.1 | 0.1 | 0.1 | 0.1 | 0.1 |
| n-Pentane | 0.1 | 0.2 | 0.4 | 0.4 | 0.4 | 0.4 | 0.3 |
| 3-Methylbutene-1 | Nil | 0.3 | 0.4 | 0.4 | 0.4 | 0.5 | 0.4 |
| Pentene-1 | Trace | 2.1 | 2.4 | 2.5 | 2.5 | 2.7 | 2.4 |
| 2-Methylbutene-1 | 1.1 | 28.4 | 30.3 | 31.0 | 31.1 | 31.5 | 30.3 |
| Trans-Pentene-2 | | | | | | | |
| cis-Pentene-2 | 1.7 | 6.2 | 8.2 | 8.2 | 8.6 | 8.6 | 7.3 |
| 2-Methylbutene-2 | 49.5 | 49.8 | 48.0 | 47.5 | 46.7 | 45.9 | 49.1 |
| trans-4-Methylpentene-2 | 3.0 | 2.0 | 1.8 | 1.4 | 1.8 | 1.7 | 1.7 |
| 2:3-Dimethylbutene-1 | | | | | | | |
| Cyclopentane | Nil | Trace | 0.1 | Trace | 0.1 | Trace | Trace |
| cis-4-Methylpentene-2 | 0.4 | 0.3 | 0.3 | 0.2 | 0.2 | 0.2 | 0.3 |
| 2-Methylpentene-1 | 2.2 | 2.1 | 1.4 | 1.2 | 1.0 | 1.0 | 1.6 |
| Isoprene [1] | 2.2 | | | | | | |
| 2-Methylpentene-2 [1] | | 0.6 | 1.2 | 1.3 | 1.5 | 1.7 | 1.1 |
| 2:3-Dimethylbutene-2 [2] | 0.3 | 0.3 | 0.3 | 0.3 | 0.3 | 0.3 | 0.3 |
| Cyclopentene [2] | | 3.7 | 5.0 | 5.1 | 5.1 | 5.2 | 4.8 |
| Trans-Piperylene | 22.0 | 1.8 | 0.1 | 0.1 | Nil | Nil | 0.2 |
| Cis-Piperylene | 11.5 | 0.7 | Nil | Nil | Nil | Nil | Trace |
| Cyclopentadiene-1:3 | 5.5 | 1.4 | Nil | Nil | Trace | Nil | Nil |
| Unknown | 0.5 | 0.1 | Trace | 0.2 | 0.2 | 0.2 | 0.1 |
| H₂ Uptake: Mol H₂/Mol Diene | | 0.89 | 0.99 | 0.96 | 0.99 | 0.99 | 0.99 |

[1] These two appeared as a single peak.
[2] These two peaks were not completely separated.

EXAMPLE 3

A nickel-on-sepiolite catalyst was prepared as follows: 200 ml. (87 g.) of sepiolite, crushed to 6–10 mesh and roasted for 2 hrs. at 550° C., were impregnated with a solution of 29 g. nickel formate, $Ni(HCO_2)_2.2H_2O$, in 80 ml. ammonia solution (SG. 880) and 20 ml. distilled water. All the solution was absorbed. The catalyst was dried in a current of air at 100° C. for 3 hrs. The nominal nickel content was 9.6% wt.

The catalyst was activated by treatment with hydrogen at 250° C. for 2 hours at atmospheric pressure and 1000 vol./vol./hour.

10 ml. batches of the activated catalyst were treated with a solution containing 0.5% by wt. of thiophene in normal heptane. In each case the space velocity employed was 2 vol./vol./hr. and pressure was atmospheric. Time and temperature of the treatment was varied as shown in Table 1.

In separate runs the catalysts so obtained were used in a fixed bed in a tubular reactor using downflow for effecting the continuous isomerisation of 4-methylpentene-1 employed as a 5% by wt. solution in normal heptane, the isomerisation temperature being 105° C., the space velocity being 2 vol./vol./hr. and the pressure being atmospheric. The feedstock was passed over the catalyst in vapour phase in admixture with 540 vol./vol./hour of hydrogen. The length of the runs was in each case 30 minutes.

Results obtained are shown in the following Table 3.

Table 3

| Catalyst Reference | Conditions of thiophene pre-treatment | | | Analysis of product | | | | |
|---|---|---|---|---|---|---|---|---|
| | Temperature (° C.) | Period of treatment, hours | Resulting S/Ni atomic ratio | 4MP1 | 4MP2 | 2MP1 | 2MP2 | 2-Methyl-pentane |
| A | 100 | 1 | 0.059 | Trace | 26.6 | 10.3 | 56.0 | 7.1 |
| B | 150 | 3 | 0.08 | | 11.6 | 10.6 | 65.0 | 12.8 |
| C | 175 | 5 | 0.12 | | 11.9 | 11.8 | 64.2 | 12.1 |
| D | 200 | 4.5 | 0.25 | | 15.2 | 12.7 | 66.6 | 5.1 |
| E | 225 | 6 | 0.37 | Trace | 38.0 | 11.0 | 50.2 | 0.8 |
| Equilibrium proportions at 100° C | | | | 0.6 | 11.7 | 16.9 | 70.8 | |

EXAMPLE 4

Catalysts B and E after use as described in Example 3 were further employed for the treatment of an undiluted 4-methylpentene-1 feedstock, again using an isomerisation temperature of 105° C., a space velocity of 2 vol./vol./hour and atmospheric pressure. The feedstock was passed over the catalyst in admixture with hydrogen which was employed at a space velocity of 540 vol./vol./hr. The length of the runs was in each case 30 minutes.

Analysis of the product is given in Table 4.

Table 4

| Catalyst | Analysis of product | | | | 2-methyl-pentane |
|---|---|---|---|---|---|
| | 4MP1 | 4MP2 | 2MP1 | 2MP2 | |
| B | Trace | 19.3 | 12.9 | 62.8 | 4.9 |
| E | 30.4 | 54.3 | 2.4 | 11.7 | 0.2 |

EXAMPLE 5

Catalysts A, C and D, after use as described in Example 3 were further employed for the treatment of a feedstock consisting of a 5% by wt. solution of 4-methylbutene-1 in normal heptane in the presence of hydrogen. Feedstock space velocity was 2 vol./vol./hour, the isomerisation temperature was 105° C. and reaction pressure was atmospheric. Hydrogen space velocity was 540 vol./vol./hour.

Product analysis is given in Table 5.

Table 5

| Catalyst | Analysis of product | | | |
|---|---|---|---|---|
| | 2-methyl-butane | 3-methyl-butene-1 | 2-methyl-butene-1 | 2-methyl-butene-2 |
| A | 0.9 | —combined—0.3 | 12.3 | 86.5 |
| C | | 5.2 | 10.6 | 84.1 |
| D | | 3.7 | 11.1 | 85.2 |
| Equilibrium proportions at 100° C | | 0.6 | 17.0 | 82.4 |

EXAMPLE 6

A further sample of the activated catalyst described in Example 1 was modified by treatment with a $C_5$–$C_6$ olefinic hydrocarbon fraction containing 0.07% by wt. of sulphur compounds present mainly as thiophenes and in which the mercaptan content was less than 0.005% by weight. This fraction was passed continuously over the catalyst at 100 lbs./sq. in. gauge with hydrogen in the mole ratio 1:3 at temperatures reaching a maximum of 150° C. for 15 hours.

This catalyst was used for the isomerisation of substantially pure 4-methylpentene-1.

This feedstock was fed over the catalyst, with hydrogen in a mole ratio of 1:1 at 200 lbs./sq. in. gauge, 1 vol./vol./hour and 152° C. Product of a 10 minute period of the run was collected and had the analysis (percent by wt.) determined by gas chromatography, shown in Table 6.

The content of 2-methylpentene-2 in the product olefins was 98% by wt. of its theoretical equilibrium concentration.

EXAMPLE 7

The feedstock used was 99.5% by wt. purity 4-methylpentene-1 containing 0.2% of isohexane. This feedstock was fed over the catalyst previously used according to Example 6, with nitrogen in a mole ratio of 1:1 at 200 lbs./sq. in. gauge, 1 vol./vol./hour and temperatures as shown in Table 6. Products of two 10 minute periods of the run were collected and had the analysis (percent by wt.) determined by gas chromatography, shown in Table 6.

The content of 2-methylpentene-2 in the product olefins was 92% by wt. of theoretical equilibrium concentration at 178° C.; and 101% at 202° C.

Table 6

| | Example 6 | Example 7 | |
|---|---|---|---|
| Temperature, ° C | 152 | 178 | 202 |
| Isohexanes | 22.9 | 0.2 | 0.3 |
| 4-methylpentene-1 | 1.1 | 2.3 | 2.0 |
| 4-methylpentene-2 (cis- and trans-) | 13.2 | 24.9 | 18.8 |
| 2-methylpentene-1 | 13.7 | 15.6 | 18.5 |
| 2-methylpentene-2 | 48.8 | 56.8 | 60.1 |
| Hexenes | 0.3 | 0.2 | 0.3 |

We claim:
1. A process for the isomerisation of a mono-olefinic hydrocarbon by double bond migration which comprises passing said hydrocarbon over a supported catalyst at a temperature between about 50° and 250° C., said catalyst containing nickel which, in said temperature range, is present in major proportion as elemental nickel, said catalyst having been previously modified by treatment with at least one sulphur-containing material selected from the group consisting of thiophenes, thiacycloalkanes having at least 4 carbon atoms per ring and dialkylmonosulphides, at a temperature in the range of 0–200° C., said treatment being carried out such that sulphur is combined with the elemental nickel in an amount between 1 and 40 mol percent of sulphur based on the total elemental nickel in said elemental nickel-containing catalytic material prior to said treatment with said at least one sulphur-containing material.

2. A process as specified in claim 1, in which the feedstock is a mono-olefinic hydrocarbon having 4–6 carbon atoms per molecule.

3. A process as specified in claim 1, in which the modification of the catalyst is effected by treatment with thiophene ($C_4H_4S$).

4. A process as specified in claim 1, in which the modification of the catalyst is effected by treatment with a thiacycloalkane having at least 4 carbon atoms per ring.

5. A process as specified in claim 1, in which the modification of the catalyst is effected by treatment with a dialkylmonosulphide.

6. A process as specified in claim 1, in which the element nickel is present in said catalyst in an amount between 2 and 20% by weight of total catalyst.

7. A process as specified in claim 1, in which the feedstock contains 4-methylpentene-1.

8. A process as specified in claim 1, in which the feedstock is passed continuously over the catalyst while in admixture with hydrogen.

References Cited by the Examiner
UNITED STATES PATENTS

| | | | |
|---|---|---|---|
| 2,375,687 | 5/45 | Peterson et al. | 260—683.2 |
| 2,402,493 | 6/46 | Greensfelder et al | 260—683.9 |
| 2,488,145 | 11/49 | Smith et al. | 260—683.9 |
| 2,497,176 | 2/50 | Mason | 260—683.9 |
| 3,004,914 | 10/61 | White | 208—255 |

ALPHONSO D. SULLIVAN, *Primary Examiner.*